(12) United States Patent
Littlestar et al.

(10) Patent No.: US 11,112,049 B2
(45) Date of Patent: Sep. 7, 2021

(54) SYSTEM AND METHOD FOR TRANSIENT MITIGATION DEVICE IN CONTINUOUS PIPELINES FOR SURGE IMPACT CONTROL

(71) Applicant: SMART PIPE COMPANY, INC., Houston, TX (US)

(72) Inventors: Gary Dean Littlestar, Houston, TX (US); Chris Dean Littlestar, Houston, TX (US); Aron Robert Ekelund, Houston, TX (US); Ivan Capistran Mandich, New Orleans, LA (US)

(73) Assignee: SMART PIPE COMPANY, INC., Houston, TX (US)

( * ) Notice: Subject to any disclaimer, the term of this patent is extended or adjusted under 35 U.S.C. 154(b) by 0 days.

(21) Appl. No.: 16/937,090

(22) Filed: Jul. 23, 2020

(65) Prior Publication Data

US 2021/0025530 A1   Jan. 28, 2021

Related U.S. Application Data

(60) Provisional application No. 62/877,501, filed on Jul. 23, 2019.

(51) Int. Cl.
   *F16L 55/053*   (2006.01)
   *G01H 3/00*     (2006.01)
   *F16L 55/04*    (2006.01)

(52) U.S. Cl.
   CPC ........... *F16L 55/053* (2013.01); *F16L 55/041* (2013.01); *G01H 3/00* (2013.01)

(58) Field of Classification Search
   CPC ......... F16L 55/053; F16L 55/041; G01H 3/00

USPC .......................................................... 138/30
See application file for complete search history.

(56) References Cited

U.S. PATENT DOCUMENTS

| | | | | |
|---|---|---|---|---|
| 2,712,831 A | * | 7/1955 | Day | F16L 55/054 |
| | | | | 138/26 |
| 2,838,073 A | * | 6/1958 | Bruce | F16L 55/052 |
| | | | | 138/30 |
| 3,473,565 A | | 10/1969 | Blendermann | |
| 3,625,242 A | * | 12/1971 | Ostwald | F16L 55/052 |
| | | | | 138/30 |
| 3,874,417 A | | 4/1975 | Clay | |

(Continued)

*Primary Examiner* — Daphne M Barry
*Assistant Examiner* — David R Deal
(74) *Attorney, Agent, or Firm* — Juan J. Lizarraga (57) ABSTRACT

A device and method to mitigate transient events in a transported medium of fluids and gases subjected to surges, and over pressure events caused by the transient state of a transported medium in a continuous pipeline, where the device has one or more concentrically positioned multilayered composite pipes encased in an outer spool pipe with an annulus space between the spool pipe and the multilayered composite pipes, with flanged adaptors at each end of the device for inline installation in a pipeline, with a management system for receiving, processing and transmitting information gathered in combination with existing pipeline monitoring, and acoustical detection system for receiving and processing of acoustic transmission due to an acoustical wave. Mitigation of pressure events is achieved by energy dissipation and expansion of the multilayered composite pipes and reduction of amplification of pressure waves is achieved by initiation of active counter waves by expansion of the multilayered composite pipes to sinusoidal shape.

9 Claims, 8 Drawing Sheets

(56) References Cited

U.S. PATENT DOCUMENTS

| | | | | |
|---|---|---|---|---|
| 3,878,867 | A | * | 4/1975 | Dirks .................... F16L 55/054 138/30 |
| 4,497,388 | A | * | 2/1985 | Dexter .................. F16L 55/053 138/30 |
| 4,500,487 | A | | 2/1985 | Christie et al. |
| 4,732,176 | A | * | 3/1988 | Sugimura ................ F15B 1/16 138/30 |
| 5,860,452 | A | * | 1/1999 | Ellis ..................... F16L 55/054 138/30 |
| 6,293,311 | B1 | | 9/2001 | Bushi et al. |
| 6,418,969 | B1 | * | 7/2002 | Bertagna ............... F16L 55/054 138/28 |
| 7,108,015 | B2 | * | 9/2006 | Lombari ............... F16L 55/054 138/30 |
| 7,306,006 | B1 | * | 12/2007 | Cornell .................. F15B 1/021 137/565.01 |
| 8,678,042 | B2 | * | 3/2014 | Quigley ................. E21B 17/20 138/129 |
| 2015/0345688 | A1 | | 12/2015 | Kersey et al. |
| 2017/0315567 | A1 | | 11/2017 | Graffin |
| 2019/0219473 | A1 | | 7/2019 | Littlestar et al. |
| 2020/0158063 | A1 | * | 5/2020 | Elder ................ F16L 55/02781 |

* cited by examiner

FIG. 1

DETAIL 1

SECTION A-A
FIG. 2

ISOMETRIC "C" SHAPE SECTION
FIG. 4

FIG.11a DETAIL

DET.11a  FIG.11

TMD PHASE 1 ACOUSTIC SIGNATURE ANOMALIES LESS THAN ±0.3 AMPL.

FIG.15 a

TMD PHASE 2 ACOUSTIC SIGNATURE ANOMALIES DENSITY

FIG.15 b

TMD PHASE 3 ACOUSTIC SIGNATURE ANOMALIES DENIED MORE

FIG.15 c

TMD PHASE 4 ACOUSTIC SIGNATURE STATE OF THE TMD BURST

FIG.15 d

SYSTEM AND METHOD FOR TRANSIENT MITIGATION DEVICE IN CONTINUOUS PIPELINES FOR SURGE IMPACT CONTROL

This application claims priority from U.S. Provisional Application No. 62/877,501 (the '669 application), filed Jul. 23, 2019. The '669 application is incorporated herein by reference.

This application relates to the subject matter of the family of U.S. patents for SMARTPIPE TECHNOLOGIES® (herein referred to as "Smartpipe") layered flexible composite pipelines including:

U.S. Pat. No. 5,551,484 Pipe Liner and Monitoring System;
U.S. Pat. No. 7,374,127 System and Methods for Making Pipe Liners;
U.S. Pat. No. 7,258,141 Pipe Liner Apparatus and Methods;
U.S. Pat. No. 8,567,448B2 Methods and Systems for In-Situ Pipe Lining;
U.S. Pat. No. 8,567,450B2 In-Situ High Pressure Pipe Manufacture;
U.S. Pat. No. 9,310,014B2 Pipe and Systems and Methods for Making Pipe for Installation in a Pipeline;
U.S. Pat. No. 9,453,606 Movable Factory for Simultaneous Mobile Field Manufacturing and Installation of Non-Metallic Pipe;
U.S. Pat. No. 10,288,207 In Line Inspection Method and Apparatus For Performing In Line Inspections; and
U.S. Pat. No. 10,436,667 In Line Inspection Method and Apparatus For Performing In Line Inspections.

The U.S. Pat. Nos. 10,288,207 and 10,436,667 patents for In Line Inspection are for methods of continuous or intermittent monitoring of the structural health of any RTP (Reinforced Thermoplastic Pipe) system that is fitted with a multiplicity of discreet sensors, whereby this novel system is integral to the Transient Mitigation Device (TMD) technology of the present invention as it provides data used in the TMD simulations.

These listed patents are incorporated here by reference. It should be noted that the specific product "Smartpipe" RTP (a multi layered composite pipe) is a patented invention and the present patent application conforms to the extended art of the "Smartpipe" RTP invention where the present invention compliments the original product, and adds a novel application to facilitate an existing industry need to control pipeline over-pressure and surge pressures utilizing a composite pipe-based device. It is well known that the pipelines can be subject to destructive pressure surges, over MOP (a maximum operating pressure) pressure events, and internal transient pressure impacts, all in excess of the operating conditions of the pipeline and are due to the transient state of the transported medium in different flow regimes and determined by valve closures, planned and unplanned, and unknown pipeline obstructions. The present invention is designed specifically to mitigate transient pressure events with a composite piping system (RTP), for installation within a host pipeline or steel apparatus, or as a stand-alone apparatus for transporting potentially explosive, flammable, and/or toxic liquids such as hydrocarbons, refined products, and gases such methane and propane, and water at high pressures, in order to prevent significant structural damage to such pipelines or conduits. This novel system has not been available in the industry in the field using composite pipe (RTP) structure until now.

BACKGROUND OF THE INVENTION

The present invention relates to a method and structurally inventive system-construction or mechanism for mitigation by attenuation of transient events of a transported medium of fluids and gases subjected to surges, and over pressure events caused by the transient state of a transported medium in different flow regimes generally caused by valve closures, planned and unplanned, and unknown pipeline obstructions, as related here, on non-metallic pipelines and conduits of composite flexible structures instrumented with detection monitoring, activating and deactivating of such inventive systems. Although the TMD (Transient Mitigation Device) is entirely comprised of composite pipe elements, the TMD composite system can also be installed independently into a steel pipe system to protect that composite system, where it would serve as a pressure surge mitigation device in a linear form with the pipeline, as opposed to vacuum tanks presently used at the remote part of the installation of pipelines.

The TMD system is a composite pipe made from polymeric materials. The structural reinforcement fibres, in multiple layers, bear the pressure load, and have an elastic modulus, and flexibility that provides for maximum deflection, while still functioning within the operating parameters during destructive surges and over-pressure events, caused by surges in the transient state of the transported medium. Due to the flexible nature of the composite TMD, the mitigation of the surge pressure magnitude is controlled by the hoop expansion of the TMD assembly to not exceed a pre-determined design including safety factors. The Smartpipe® performance in its original function as the primary pipeline is capable of mitigating a transient surge pressure, because the Smartpipe® is designed to expand within an annulus space encased by a rigid pipe sleeve. The structural reinforcement of the Smartpipe®, the fibres that bear the pressure load have an elastic modulus that is about one third that of steel. Considering that the surge pressure magnitude is very much dependent on the hoop expansion and the stiffness of the pipe, the effects of a transient event would be considerably mitigated by the Smartpipe® TMD device product, due to available hoop expansion and stiffness compared to steel, and in such function it will reduce the magnitude of the surge pressure. Additionally, the properties of the polymer used in the fibres, are of a much larger delta between the short term burst pressure and the maximum operating pressure of Smartpipe® than that of a steel pipe. The short term and long term burst pressures for steel are practically the same, and this is not the case for a composite Smartpipe. The composite materials are subjected to creep and creep rupture until a failure mode is reached. The maximum operating pressure for Smartpipe® is based on long term testing where a lower boundary strength is obtained, and used for an intended service life while designing with the various fluids in service of the pipeline. A quick burst pressure test of Smartpipe would indicate that Smartpipe® can withstand a transient pressure surge of approximately 5 times the maximum operating pressure. The TMD as a spooled type device without a rigid sleeve can also be applied in its freestanding capacity where it can function at different modalities subject to an engineering design. This would involve the shape modifications, undulations, various types of induced wave forms, and other type of combinations in pipelines.

The TMD device is not currently available in the industry, and with this invention it can be provided, for example, in the form of a short section installed in a rigid sleeve, where it would be readily transported to site. The TMD application in a spooled type device without rigid sleeve will also have a capacity to fulfill this function at different modalities. The TMD device can be used in lengths of pipeline up to 10 miles between connectors, as continuous pipelines, or lined pipelines, and the TMD can be manufactured and installed on site. The present known methods used in the industry are related to mitigation of surge impacts and anomalies in the flow, and are all limited to outside containment devices which absorb flow impacts from the pipelines by means of safety valves, or diversion valves causing the over-pressure flow to divert to lower pressure tank systems, vacuum pressure tank systems, alternate steel line segments, and with such devices as flexible loops that are added to the pipelines in order to compensate for the expansion and stress concentrations.

Fluid carrying pipelines are subject to transient pressure with spikes in pressure, whenever the flow in velocity becomes altered by events such as a valve closure, a sudden pump shutdown, or by some other means of the blockage of the flow. The pressure spike magnitude depends on how quickly the flow velocity is changed. Due to the compressibility of the fluid and the hoop expansion of the pipe, stopping the flow at one end of a pipeline does not immediately stop the flow at the other end. More fluid will tend to flow into the pipeline. The effect is termed "packing". This condition causes a surge in a pipeline's pressure. The time that it takes for a pressure wave to traverse the length of the pipeline, will increase the "packing" pressure and will significantly increase the impact of the "hammer" effect depending on the pipeline length. The length of the pipeline affects the transient pressure waves in several combinations. The mass of a fluid in the pipe is proportionally manifested in relationship to the length of the pipeline. When the flow is stopped, all of the fluid mass is slowed to a full stop. The force derived from such activity of the proportionality of the mass and the length of the pipeline will impact the structure of the pipeline. Offsetting this effect of the length of the pipeline is mitigated by the effect of friction in the flow regime. The friction between the fluid and the pipe wall is always acting to slow the fluid and it is demonstrated by an accumulated total friction force which is also proportional to the pipeline's length. The property of a fluid's viscosity versus the diameter of the pipe has a significant effect on the friction force. Based on the time it takes for a pressure wave to travel the length of the pipeline and then upon its reflected return to the point where the flow is being interrupted (i.e., the source of the pressure wave) the friction force is formulated. The initial pressure distribution along the pipeline and the flow friction increase in its variability and demonstrates a mode by which the pressure forms the surge. It was found that in long pipelines the wave length may spread over a long distance with an amplitude that can engage a pipe section longer when compared to a standard and a practical and manufactured TMD device, which will be manufactured as a means of being a transportable section, readily inserted, as a complete system, or as replaceable cartridge where necessary. Variations of the TMD devices can also be manufactured in a combined form having multiple walls, and where such assembly would eliminate the need for rigid sleeves, providing the means of coiling the device in long lengths to be suitable for transportation and installation. This type of coiled TMD device can be used in case where longer sections in pipelines are needed to attenuate the hydraulic hammer impact from long waves. A fractional volumetric change of the liquid is caused by the pressure change, under a condition where the wave speed is pressuring the liquid against a rigid (stiff) pipe, causing the pipe's hoop expansion, and where the resulting wave propagation and its speed of the liquid increases to a point where the rupture or failure of the pipeline occurs. The surge under such pressure can be described as a kinetic energy accumulation within the fluid, which is then mitigated by the energy absorption by means of the flaw's frictional losses, and by regulating mechanical means where the energy conversion by the TMD invented device, stores, offsets, and converts the potential energy into a manageable force, or reduces the potential energy of a wave by reducing amplification through initiating an active counter wave of similar frequency, phase and amplitude. The TMD is a device with the flexible pipe wall allowing for the expansion due to a high strength of the materials used and under the controlled design it is capable to absorb and to attenuate the effects of the hydraulic force stress. The lower hoop stiffness of the Smartpipe® flexible properties will absorb and attenuate more energy for a given increase in pressure when compared to a rigid type of pipe, such as a steel pipe. If it were not for the elasticity of the pipeline material and the compressibility of the liquid, simple physics predicts infinite pressure would result from an instantaneous valve closure and other irregularities that are associated with a pipeline operation. The novelty of this invention is based on a compensation mechanism where the liquid and the pipe are elastic and engaged in minimizing the surge pressures. Rigid steel pipelines cannot mitigate fluid surges within their walls, due to lack of elasticity, and are not capable of containing or attenuating surge pressures to prevent the damage. The rate of flow under a change of velocity and pressure in the pipelines is usually mitigated by equipment with the in-line valve closing operations and when over pressured by use of external safety valves, or diversion valves causing the excess pressure flow to divert to lower pressure tank systems, vacuum pressure tank systems, or to alternate steel line segments, and segments with flexible loops added to the pipelines to compensate for the expansion due to the stress force concentrations. Industry standards or performance allowances by authorities that regulate pipelines limit internal pressures in steel pipelines during surge events to no more than 10% above the pipeline's maximum operating pressure. (ASME B3 1.4 paragraph 403.3.4)

The TMD inventive system provides for an in-line spooled or sectional device, prefabricated and ready for insertion into an operable pipeline at any designated point where the surge pressures are subject to occur. The TMD system is also a prefabricated stored system ready to be used in case of emergency. The TMD system can also be made available in long lengths and coiled to be transported to the site for installation. This type of the coiled system has an outside flexible sleeve composed of multi-layered material and concentrically positioned with the inner composite pipes.

The TMD method also has a unique benefit in the case of the variable pressure mitigation in pipelines where a rate of absorption would require a special design for its attenuation, and where the step down attenuation is accomplished by a multiple concentric pipe system within the TMD device. The offsite manufacturing provision and delivery of such finished product as a ready-made device for the shipment to distant sites for installation can be done. The TMD inventive system can also be produced at the project site, and it is transportable by various methods of transportation. The TDM product is a light type construction assembly suitable for standard type equipment in installation.

The TMD assembly consists of and functions in concept based on the elasticity of the Smartpipe® and its capacity to carry significant over pressures on a short term basis, with its "stretching and plastic" capacity. The TDM system uses the helical reinforcement of the Smartpipe® where a balanced hoop stress and axial strain attenuate the surge pressure within the pipeline, facility or conduit system.

Furthermore, the TMD inventive system is equipped with electronic monitoring sensors which determine the stress ratio in the device and can combine with a rest of the pipeline's continuous measuring mode. Prior to delivery of the TMD product tests and certifications is part of the system's factory manufacturing procedure. The system for acoustical, strain, temperature and pressure detection is a method of determining the capacity of the TMD, where the stages of the performance of the TMD device clearly are conveyed into the computerized data gathering and are interpreted accordingly showing at least four stages towards the desirable failure of the TMD device. This safeguards and instructs the TMD device to be installed for the operator to recognize the condition of the water hammer impact and necessary steps for the event rectification. The acoustical detection system is also provided in actual operation of the TMD in the pipeline.

SUMMARY OF THE INVENTION

The inventive system and methods for an upset surge pressure mitigation in pipelines by means of the in-line insertion of the TMD product is a novel method and apparatus which is non-existent in the presently available pipeline industry. The TMD product inspection from manufacturing, through the transportation and installation, is a pre-designed element for upset surges and peak pressures in the pipelines and conduits, and it is designed to be responsive in a specific pipeline.

The inventive TMD system is a regulating component device, inserted as a fully assembled piece, in one or more places at the designated points of the pipeline. The TMD function will interrupt the wave propagation by altering the wave geometry and offsetting the upset surge pressures along the length of the pipeline and by attenuating the wave function. The designed TMD system can be specific to resolve and to nullify wave propagation by attenuation and to convert the flow into a laminar regime inside the pipeline. The TMD device is a continuous piece of the pipeline as opposed to an outside component of the pipeline installation, re-routing of the pipeline with a bypass or other means of compensatory equipment such as vacuum tanks. This continuation is beneficial in preserving of a steady flow in the pipeline; it reduces the hydraulic losses as compared to looped sections of the pipeline which are counted as loss in the flow. The advantage of the TMD device is that laminar liquid flow is continuing under the normal operation of the pipeline and that the upset surge is mitigated and attenuated with the same system. Such dual purpose of TMD device is of the same function as the rest of the pipeline where it does not offset a continuity of the flow, but it is more used or fatigued under the surge pressures, and for that reason may have a replacement life shorter than the rest of the remaining pipeline. The TMD is then the element readily available for replacement as needed. It is also possible that TMD system needs to be inserted at different locations in a pipeline, in order to compound the effect of the surge attenuation. Such determination is a subject of a design. Multiple combinations are possible including TMD installation above ground, within a building, underground, in conduits, culverts, and within the processing pipelines and conduits.

The inventive system also provides TMD product as a standby manufactured device for the pipelines, or a coiled device, which is stored and ready to be used in case of emergency replacement as would be required by customers.

It is also equipped with multiple sensors and a monitoring system capable to inform the user of the TMD device performance and also to be coordinated within the overall pipeline monitoring system. The TMD devices as designed are utilizing Smartpipe® composite pipe designs within a chamber assembly and the sleeve system with flanged ends. These end pieces fit with the existing pipeline as constructed for insertion of the TMD device into the line. The long type TMD devices are made as assembly of the Smartpipe® multilayered concentric flexible pipes, capable of being coiled and transported to the site for installation due to the flexible sleeve.

The inventive system for TMD device for the pipelines is described with the following inclusions of the drawings and noted items or the components for better understanding of this "first-to-file" document designated as the figures from 1 through 14.

It is an objective of this invention to provide an apparatus for TMD capable of resolving and attenuating the upset surges and peak stress accumulations in the pipelines. The TMD mechanism is claimed to be invention in its entirety manufactured in one assembled piece, ready for transportation to the site for installation, constructed by insertion into the pipeline and conduits, which may be renewed, reconstructed, and stand alone, where it will be used for surge impact dissipation, attenuation and potentially nullification. It is further intended to provide such a TMD system with the monitoring components and sensors where the TMD device has the reporting quality of relating the wave and stress propagations from the surges in operation of the pipeline, whereby, it informs the user of the fluctuations in the pipeline and allows for the planning of the remedial actions to lower the impacts, such as control of the valve closures, and pressure modifications.

It is further intended to provide the means of constructing several methods of long and short TMD devices for insertion and construction within different configurations of the pipelines and conduits, e.g. above ground, below ground and in industrial pipelines, emergency and new installations, storage of the TMD devices for the stand-by-installation, where surge could be predicted and where temporary controls are implemented by reducing pressures and valve closures, and where the operator can decide to introduce the TMD device in order to prevent future pipeline damages.

It is further intended that the novel use of this inventive system is also constructible from round and in the Smartpipe® "C"-shape reduced cross sections for a later processing in the pipelines. The long devices are also coiled and delivered to the site for installation and processing.

It is further intended that the novel method of the new pipeline designed structures may require a multiplicity of the inner composite liners in a concentric configuration which would produce attenuation a step down reduction or "cushioning" of the surge wave and dissipation of the pressure in a moderated fashion, i.e. by gradually transferring the pressure from one layer of the Smartpipe® composite pipe to another layer. These complex TMD devices would have a "dumper" effect upon the surges in the pipelines. Considering that the propagation waves may have a longer length and need to engage attenuation of the TMD system over such distance, this step-down feature would reduce the wave length in a shorter length of the TMD device which will incorporate multiple elements in a concentric form.

It is further intended that proprietary computer hardware and software is also a part of the inventive system to be used in a theoretical modeling as well as in the actual programming of the surge system, wave propagation, attenuation, temperature and the leak detections within the TMD device alone. This inventive instrumented TMD device is also sensitive to data collection relative to the pipeline function. Other measurements may be taken such as temperature changes and pipe elongations, compression loads and reporting danger and giving warnings. The acoustic system for monitoring is a method indicating the stages of the TMD device in the process of expansion and towards the burst in failure. This system transmits localized information to the operator for each unit installed. The data are collected by the method of the computerized information and processed with the warnings and instruction for further actions that are appropriate to maintain the pipeline safety condition.

It is further intended that this novel method of the invention, its engineering and mechanics are applicable to specific requirements in a specific pipeline, and can be calculated in advance to demonstrate such function of the pipeline. A custom made TMD device will allow for variable combination of the constructed elements within the product.

NOVELTIES OF THE INVENTION AND INNOVATION

The present mode of the upset surges, peak pressures and waves generated in the pipelines has no provision for the types of devices constructed in-line, and in continuity within pipelines, no provision for an in-time action on the pipeline under a sudden stress from the non-standard performance and operation of the pipeline, and no provision for temporary standby procedures possible for an in situ implementation. The manufactured TMD device is a readily available product with all monitoring components already built in, prefabricated and suitable for site installation. The reference is noted that a prior art invention Smartpipe® is used in the manufacturing of the TMD product. The TMD inventive system is suitable mostly for reinforced thermoplastic composite and other non-metallic pipelines and conduits. This novel method of ready-made TMD device, as manufactured for the insertion into a contiguous manner into the pipelines and conduits, has not been previously available in the industry.

The novelty of this inventive system is that the TMD device structure and its component members are designed specifically for the acceptance of the upset surges in the pipelines, and to fit those pipeline sizes. The TMD device length is suitable for transportation. Included in this consideration is also a type of transportation mode, such as containers, barges, flotillas, and other means of transportation.

The novelty of the structure of TMD device is that it is constructed out of a multiplicity of combinations, where the multi layers of the flexible Smartpipe® are combined into a concentric arrangements, or used as a single layer, where a cover pipe holds the assembly with an adequate solid wall, which may be made of steel and other materials, where the long devices are coiled and contained within the flexible sleeve, and where the ends of the device are specially made as the spool pieces capable of holding assembly of the Smartpipe® together with specially developed grips, and where the adaptor ends contain the measuring instrumentation and connections for electronic monitoring systems. This would include the connection to the pipeline monitoring system. The types of monitoring systems may combine radio transmitters, remote readers, direct wiring and other combinations.

The inventive system's data collection allows for the assessment of the condition of the pipeline and its abuse from surge pressures and irregularities in operation. The engineers would use the data to introduce measures to improve the pipeline operation. This may involve the redesign of the equipment outside of the pipeline.

The novelty of this inventive system is in its advantage where the new pipelines, such as composite pipelines are made of multiple components, multi layered high strength, light weight, durable and ready-made for their multi-faceted ways of installations and transportation, easy handling due to the weight factor, when compared to the heavy duty, rigid and solid type pipes which for these technical reasons are not suitable for such a long length coiling.

The novelty of the invention is in its mechanics of the methods for using the flexible multi layered composition of the high strength materials and the combinations that are modulated in order to produce capacity for attenuation of the wave and absorption of the stress and impact. This method as depicted in the FIGS. 1 through 15, illustrates the geometry that is formed in the type of the prefabricated device, in the modes of different lengths, coiled or encased inside the rigid sleeve, and transportable to the site for installation. The system illustrates the monitoring capacities for the TMD device and its ability to be incorporated with all these features directly and in contiguous way within the pipeline.

BACKGROUND OF THE INVENTION AND INNOVATION

The invention relates to the TMD devices made from the plastic and reinforced thermoplastic composite pipes and applicable to pipelines and conduits by inline insertion. The invention is a unique in-line surge protection and monitoring device, and a measuring method in such application for pipelines that provides for attenuation of the impacting forces. The TMD device is prefabricated, tested and stored, site delivered, and prepared for installation for both old and new pipelines.

The TMD technology is made available in conjunction with the prior art for making the composite pipelines.

This technology, as it relates to the composite pipelines, is capable of accommodating the "C" formed sections as well as other patented cross sections, as referenced here as "form shaped sections", and specifically noted in the Smartpipe® patents.

The pipeline coiling and the storage capacity is reserved for the longer TMD devices which may be installed over several hundreds of feet or more, and where those will function as fully operable pipelines as well as the attenuation mechanism for the impact waves. Generally, the form-shaped TMD devices are made with a reduced area in cross section of the pipes and made of flexible material suitable for coiling onto the reels or spools.

This inventive system of TMD devices, is capable to be installed in a variety of ways, such as in multiple sections at certain locations of the pipeline, in one long section, and in positions above ground, below ground, inside the host pipes and in the new pipes and conduits.

BRIEF DESCRIPTION OF THE DRAWINGS

FIGS. 15, 15a,b,c,d is a depiction of the TMD device with a preinstalled mechanism for acoustical detection or simulation, where the device conforms with the ability to form the acoustical signature in a graphical presentation of the four stages of an acoustical impact, indicated in a pattern from which is signaled to the operator the state of the TMD device itself at each unit separately. The graphical presentations 15a to 15d are distinctly differentiating the stages of the impact.

DETAILED DESCRIPTION OF THE INVENTION

Figures 1, 2, 4:
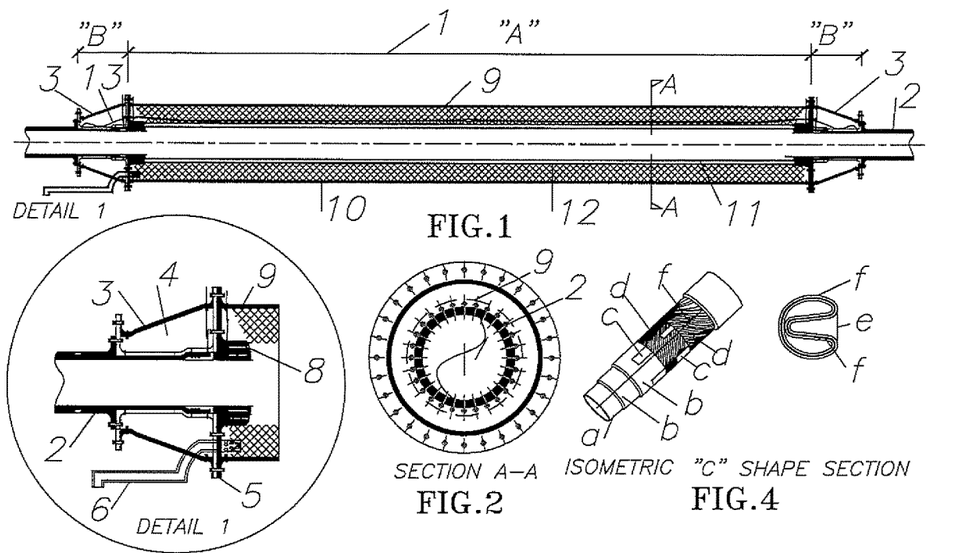
FIG. 1 is a longitudinal cross section of a factory assembled TMD (Transient Mitigation Device) inserted within a pipeline.
FIG. 2 is a transverse cross section "A-A" from FIG. 1 showing the use of a single flexible Smartpipe RTP inside the device. Multiplicity of Smartpipe RTPs and sleeves are not shown here but are similar to this section.
FIG. 4 is the isometric illustration of the internal part of the TMD device which is the Smartpipe® patented technology.

As shown in FIG. 1 and DETAIL 1, the Transient Mitigation Device (TMD) 1 of "A" length has been factory assembled and installed in a pipeline 2 cut to receive the TMD between the two open ends of the pipeline 2. The two end piece assemblies 3 of "B" length are special adaptors each mounted on the open ends of the pipeline 2 containing connecting mechanism for instrumentation 13 and providing a chamber 4 for alleviation and excess pressure mitigation from the main chamber of the TMD 1. The end piece assemblies 3 each comprise ANSI flanges 5 with ring sealers, flow through connection 7 for monitoring instruments 13, an adaptor 8 for Smartpipe RTP, a contra wave injector 6, internal o-ring seals and an instrumental monitoring port 29. The dimensions "A" and "B" are suitable dimensions for the various sizes of installation based on the design and demands for a pipeline.

The embodiment of a TMD 1 of "A" length shown in FIG. 1 has two ends each fitted with a Smartpipe RTP adaptor spool 8 for connection to the end pieces 3 mounted on the open ends of the pipeline 2. As depicted in FIG. 1, this embodiment illustrates a "confined" method of transient mitigation. The TMD 1 has an outer steel spool pipe 9 of "A" length running longitudinally between the Smartpipe RTP adaptor spools 8. As shown in FIG. 1 and the cross section "A-A" shown in FIG. 2, the outer steel spool pipe 9 acts as a casement shield for liquid fill 10 contained in the annular space 23 between the outer steel spool pipe 9 and at least one or more concentric flexible Smartpipe RTPs running longitudinally between the Smartpipe RTP adaptor spools 8, where the inside diameter of innermost flexible Smartpipe RTP 11 would be no less than the inside diameter of the pipeline 9 and the TMD 1 would act as a fully functional component of the pipeline 2. The second or multiple flexible Smartpipe RTPs 12 concentric to the innermost flexible Smartpipe RTP 11 would provide transient mitigation. In addition there would be instrumentation and monitoring 13 running longitudinally for the full length of the TMD 1 between the end pieces 3 between the concentric elements of the TMD 1.

The steps and methodology for installation of the factory assembled TMD as depicted in FIG. 1 would be as follows:
1. Cut the existing pipeline and prepare flanges;
2. Insert the factory fabricated TMD;
3. Continue assembly of the TMD of "A" length;
4. Enclose the two end piece assemblies of "B" length;

5. Flex fill the confined annulus area:
6. Connect sensors;
7. Allow for flexibility and longitudinal expansion.

Figure 3:
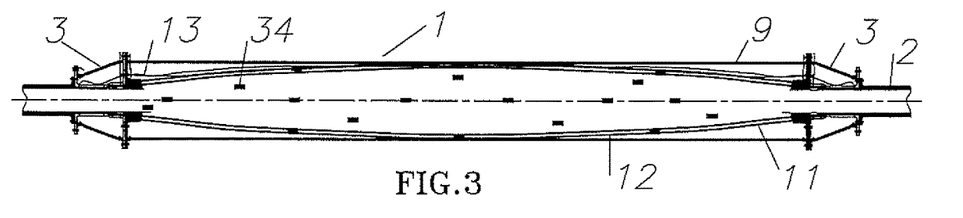
FIG. 3 is a longitudinal cross section of a factory assembled TMD device engaged and under impacts with a single flexible Smartpipe RTP inside the assembly of the rigid form of the device shown in FIG. 1. This figure also depicts the multiple positions of the sensors to be used in the monitoring of the performance of the TMD device.

FIG. 3 shows a longitudinal cross section of a factory assembled TMD 1 with a single flexible Smartpipe RTP 11 engaged and under impacts. As shown, internal shock caused by increased pressure is mitigated by energy dissipation with the system's capacity to expand and contract as well as elongate, without breaking. The strength of the TMD 1 allows for multiple uses and safety of several increases over the pressure oscillations. Also shown are monitoring sensors 34 to monitor performance and water hammer impact.

The steps and methodology for function of the factory assembled TMD 1 would be as follows:
1. Pressure (psi) in the pipeline (host pipe) develops surges;
2. The pressure may be in multiples over the allowable;
3. The TM) with flexible Smartpipe RTP allows for a high pressure impact;
4. The TMD with flexible Smartpipe RTP mitigates high pressures;
5. The system absorbs impact energy;
6. Dissipation of energy force can be by multiple engaged TMDs with flexible Smartpipe RTP;
7. The TMD with flexible Smartpipe RTP functions both as a mitigation device and as a fully functional pipeline component;
8. The system can be combined with other types of pipelines and with a Smartpipe RTP liner or a free standing pipeline.

FIG. 4 shows the components of the multi layered composite Smartpipe RTP with the components of the pipe construction including the monitoring systems, pulling systems, and other features of such composite pipe design. The typical cross section of the "shape formed" pipe is illustrated in "C" formation, among others previously patented, showing the applicability to long TMD devices. The components are depicted as follows:
a. Corepipe;
b. Wrapping layers helical and circular:
c. High strength pulling tapes with embedded woven fabric sensors;
d. Tows with embedded woven fabric sensors:
e. Covering assembly tapes, Mylar or other temporary security for the pipe shape forming and installation;
f. Sensors and readers for various pipeline functions.

Figure 5:
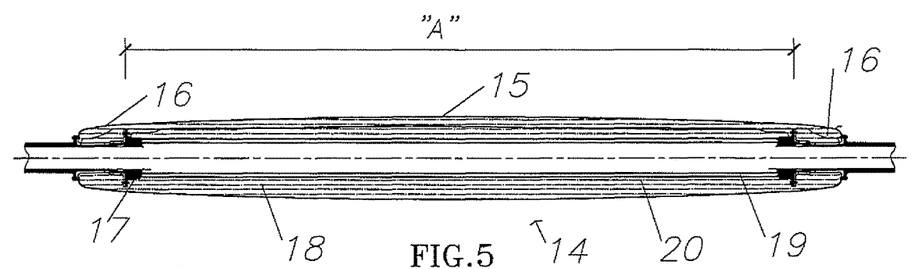
FIG. 5 is a longitudinal cross section showing the position of a flexible embodiment of the TMD device with a flexible sleeve inserted within a pipeline.
Figure 6:
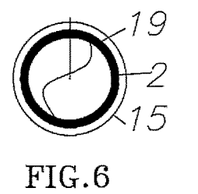
FIG. 6 is a transverse cross section of the flexible embodiment of the TMD device with a flexible sleeve inserted within a pipeline showing a single use of the flexible Smartpipe RTP inside and the flexible Smartpipe RTP outside of the device. Multiplicity of the concentrically positioned pipes is not shown here but is similar to this section.

The embodiment of the TMD device shown in FIG. 5 illustrates a flexible attenuated assembly 14 with a flexible sleeve 15. This embodiment features variable lengths, and where manufactured in longer lengths can be coiled on a reel or spool. The end pieces 16 for this embodiment 14 are special adaptors 17 containing connecting mechanism for instrumentation. The dimension "A" is a suitable dimension for various lengths based on the design and demands for a pipeline 2. The model shown in FIG. 5 indicates a singular inner flexible Smartpipe RTP pipe 19 and outer flexible Smartpipe RTP pipe 20 of the same making, but a multiplicity of pipes is also anticipated in this invention. The multiplicity of pipes is a prime means for impact wave attenuation and energy absorption. The cross section shown in FIG. 6 shows the flexible sleeve, the flexible Smartpipe RTP 19 and the host pipe 2. Also shown is the liquid fill 18 in the annular space 23 between the flexible sleeve and the flexible Smartpipe RTP pipes 19 and 20.

Figure 7:
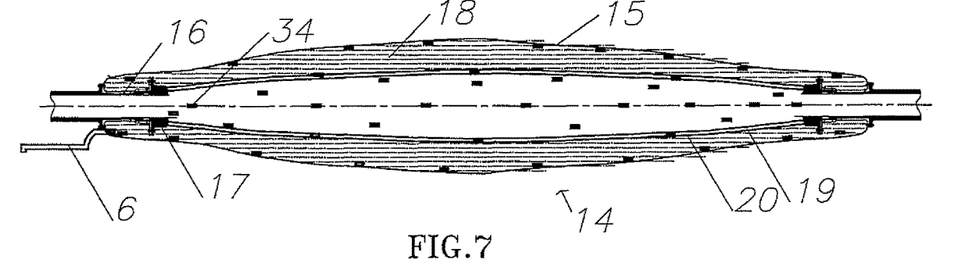
FIG. 7 is a transverse cross section of the flexible embodiment of the TMD device with a flexible sleeve inserted within a pipeline showing a single use of the flexible Smartpipe RTP inside and the flexible Smartpipe RTP outside, engaged and under impact. This figure depicts also the multiple positions of the sensors to be used in the monitoring of the performance of the TMD device.

FIG. 7 shows the flexible embodiment 14 of the TMD device with a flexible sleeve 15 inserted in line in a pipeline 2 with a single use of the flexible Smartpipe RTP 19 inside and the flexible Smartpipe RTP 20 outside, engaged and under impact. As shown, internal shock caused by increased pressure is mitigated by energy dissipation with the system's capacity to expand and contract as well as elongate, without breaking. The strength of the TMD 14 allows for multiple uses and safety of several increases over the pressure oscillations. Also shown are monitoring sensors 21 to monitor performance and water hammer impact.

Figure 8:
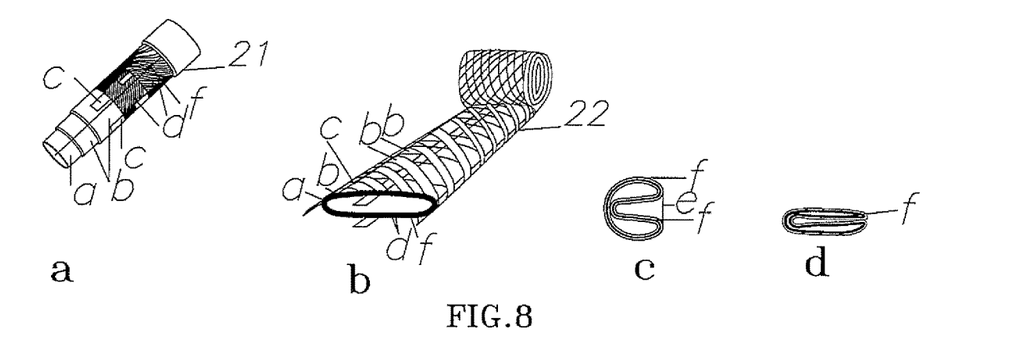
FIG. 8 is a depiction of the cured type of the TMD device with the flexible components for RTP assembled in a type of hose form, and where required capable of being flat coiled on reels and spools. This figure would contain multiple positions of the sensors to be used in the monitoring of the performance of the TMD device.

FIG. 8 shows the cured type of the TMD device with the components for flexible Smartpipe RTP assembled in a type of hose form 21, and where required capable of being flat 22 and coiled on reels and spools. The elements are as above identified in FIG. 4, with alternative cross sectional shapes shown as a, b, c and d.

Figure 9:
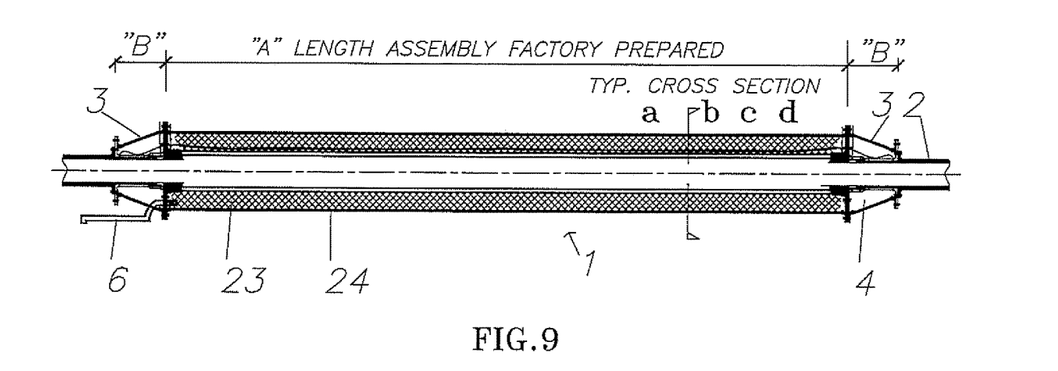
FIG. 9 is a depiction of the TMD device as installed, with provision that the annulus space can be filled with a variety of media, such as gas, fluid gel, air, or compressive type of the material, among others, and that the provision for the injection of the contra wave force by outside means, is also considered.

FIG. 9 depicts the TMD device 1 shown in FIG. 1 that has been factory assembled and installed in a pipeline 2. In this depiction it is noted that the confined annular space 23 may be filled with gas fluid, gel or other flexible medium and thermal liquids 24 if designed for heat attenuation. Also shown in the end pieces 3 of "B" length are foam expansion chambers 4 for difference in flexible pipe expansion. Also shown is the contra wave injector 6 for injection of a contra wave force by outside means.

Figures 10, 11A:
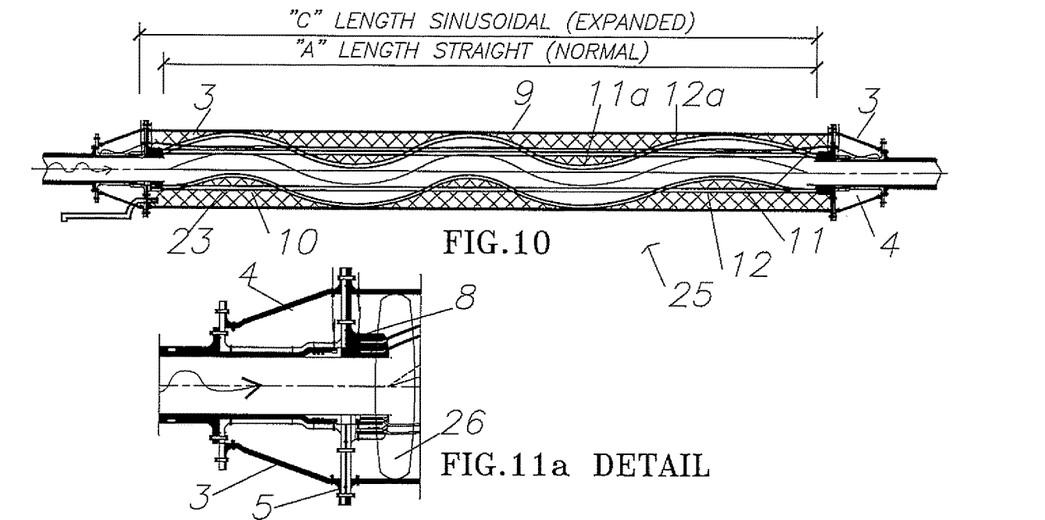
FIG. 10 is a depiction of the TMD device with a preinstalled mechanism for wave induction or simulation, where the TMD device has the ability to conform to the shape of the wave, generally in a sinusoidal pattern. This arrangement will not prohibit all other means of attenuation of hydraulic impact the TMD device is designed to sustain.
FIG. 11a shows a cross sectional detail of an end piece on the TMD device.

The embodiment of the TMD device 25 shown in FIG. 10 illustrates the oriented wave simulation feature where the TMD device 25 has the ability to conform to the shape of the wave, generally in a sinusoidal patterns and where "A" is the normal straight length and "C" is the expanded sinusoidal length. As also shown in FIG. 9, the foam expansion chambers 4 in the end pieces 3 would compensate for the flexible pipe expansion. In this TMD device 25 the outer steel spool pipe 9 would be sized in relation to the wave size. The design parameters for the TMD device 25 would be predicated on wave propagation as applicable to each pipeline 2. In FIG. 10 the annulus 23 is shown as extended to match the amplitude for wave propagation with a mechanism for one directional wave movement. The first flexible Smartpipe RTP pipe is shown is shown in both the expanded position 11a and the before position 11, compressed with the ability to expand. In this assembly in addition to the first flexible Smartpipe RTP pipe 11 there is a second or multiple flexible Smartpipe RTP pipes shown before 12 and after 12a the anticipated sinusoidal movement corresponding to wave propagation conditions.

Figure 11:
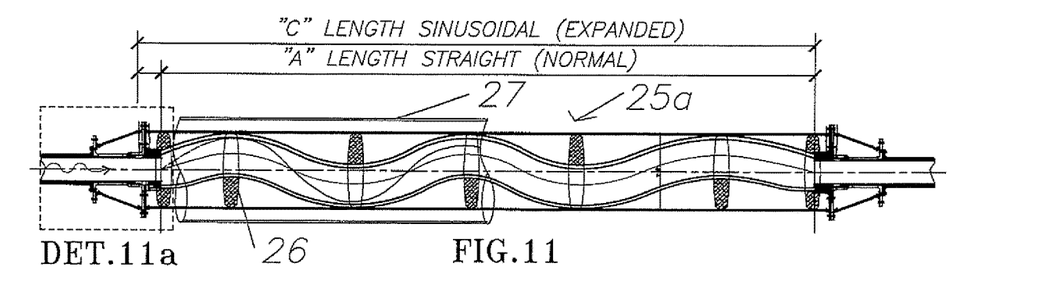
FIG. 11 is a depiction of the TMD device with a preinstalled mechanism for the wave induction or simulation, where the TMD device has the ability to conform to the shape of the wave, generally in a sinusoidal pattern and is shown with a flexible restrictive mechanism used in the wave formulation.

The embodiment of the TMD device 25a shown in FIG. 11 illustrates all the oriented wave simulation features shown in FIG. 10 with the addition of orientation collars or annulus spacers 26 that are flexible components designed to provide for orientation of sinusoidal movement and compression or expansion in conformance with the force of impact. In addition there is shown a maximum extension 27 of the outer steel spool pipe 9 to allow for maximum expansion of the TMD device 25a wave simulation movement as calculated for allowable flexible Smartpipe RTP pipe movement until breakage. As an example if the physical property of the flexible Smartpipe RTP pipe with 7% allowable expansion from where the size of the sleeve is determined and the energy absorption is calculated for a specific use. Such calculations are used to provide the sizing of the TMD overall structure.

In FIG. 11a, a cross section of one of the end pieces 3 to the TMD device 25a is shown with ANSI flanges 5 with ring sealers, and a Smartpipe RTP adaptor spool 8.

Figure 12:
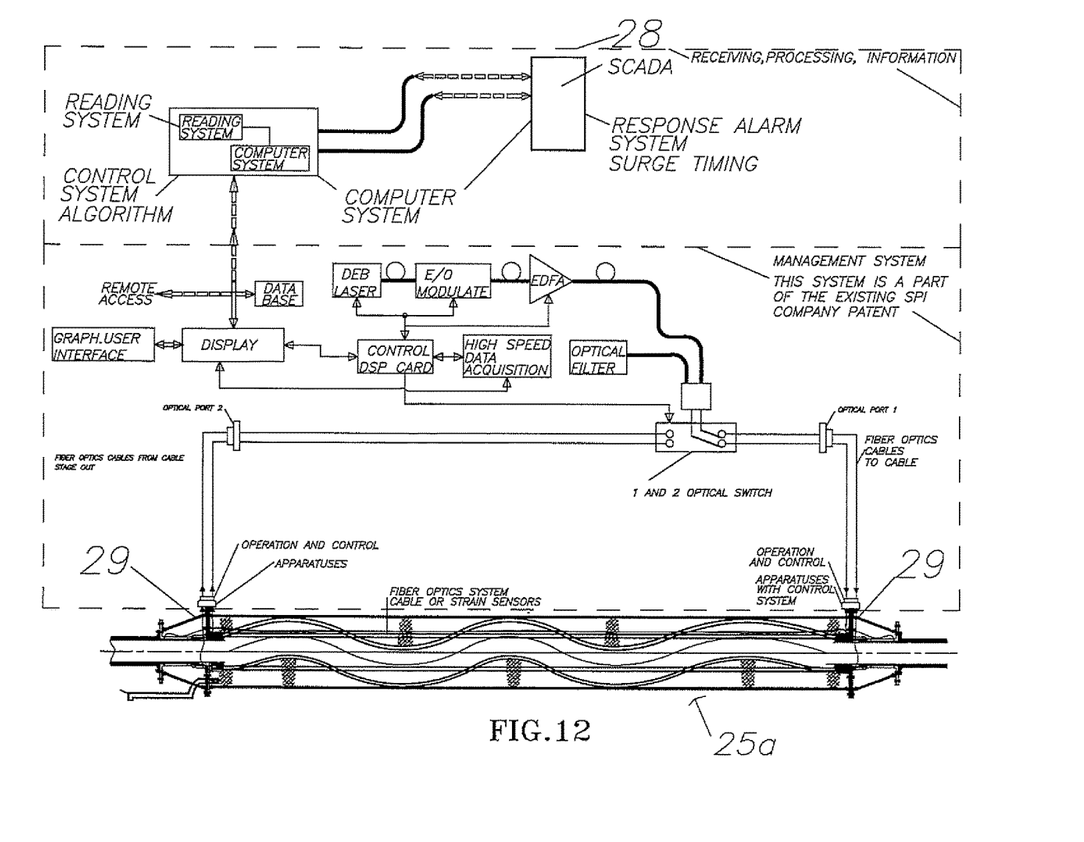
FIG. 12 is a depiction of the TMD device with the oriented wave simulation feature with a block diagram showing a system for receiving, processing and transmitting information gathered at two connected ports for processing via SCADA or other computerized means for the utilization in emergencies and in standard operation of the pipeline.

The TMD device 25a with the wave simulation feature shown in FIG. 12 is shown with a preinstalled management system 28 in block diagram for receiving, processing and transmitting information gathered from two connecting ports 29 at each end of the TMD device 25a. Among other things, the system will monitor pipeline surges for consideration as to operator intervention or a system automatic emergency procedure intervention if so programmed. This system of monitoring has several technological features where it could be combined with sensors, fiber optics, strain sensors and other means available in the contemporary technologies.

Figure 13:
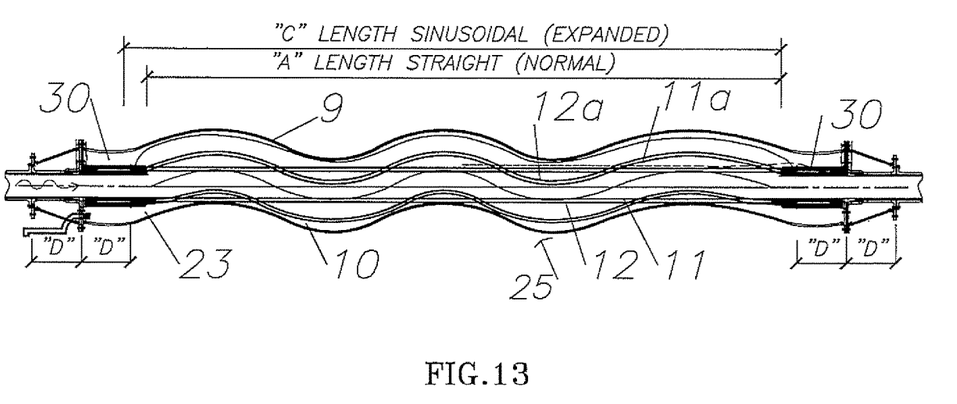
FIG. 13 is a depiction of the TMD device with a preinstalled mechanism for wave induction or simulation, where the TMD device has the ability to conform to the shape of the wave, generally in a sinusoidal pattern and shown with the outside formed casing sleeve as a rigid restrictive mechanism used in the wave formulation. This variant further provides the pre-modeling of the suppression mechanism in attenuation of hydraulic wave progression.

The TMD device 25 with the wave simulation feature shown in FIG. 13 is shown with the outer steel spool pipe 9 as a rigid restrictive mechanism used in the wave formulation with stiffener extensions 30 on the Smartpipe RTP adaptor spool 8 at each end of the TMD device 25.

Figure 14:
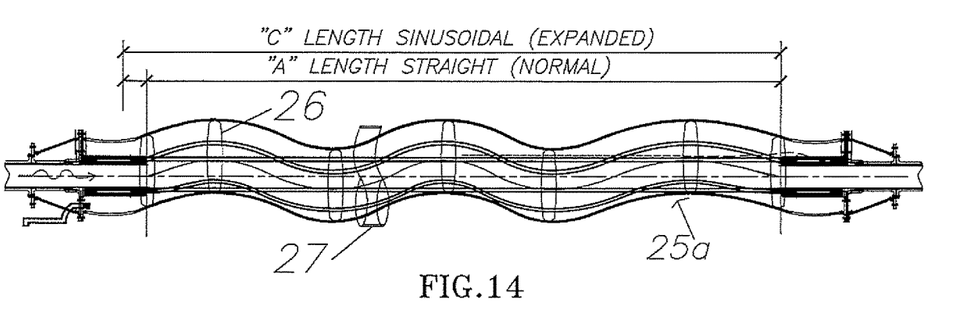
FIG. 14 is a depiction of the TMD device with a preinstalled mechanism for wave induction or simulation, where the TMD device has the ability to conform to the shape of the wave, generally in a sinusoidal pattern and shown with the outside formed casing sleeve as a rigid restrictive mechanism used in the wave formulation. The illustration depicts an indication of how far a maximum expansion of the casing pipe is designed, and it shows that the restrictive elements can be also introduced in the simulator casing pipe.

The embodiment of the TMD device 25a shown in FIG. 14 illustrates all the oriented wave simulation features shown in FIG. 13 with the addition of orientation collars or annulus spacers 26 that are flexible components designed to provide for orientation of sinusoidal movement. In addition there is shown a maximum extension 27 of the outer steel spool pipe 9 to allow for maximum expansion of the TMD device 25a wave simulation movement.

Figure 15:
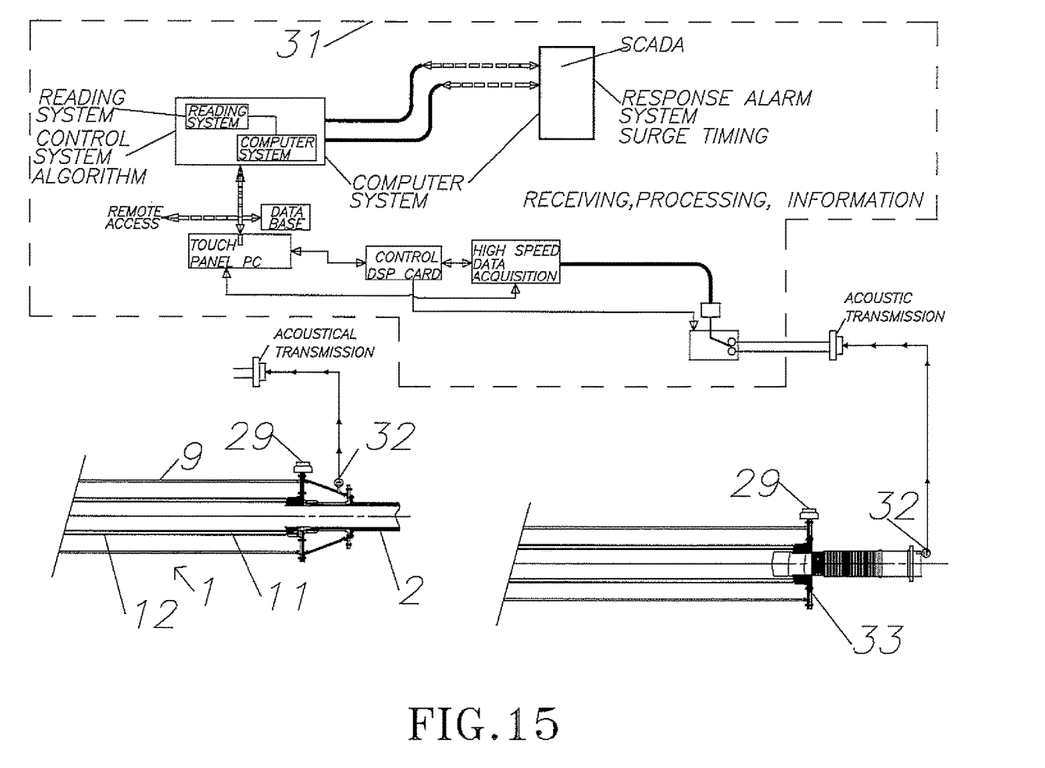

A system for acoustical detection is shown in FIG. 15 with acoustical transmission due to an acoustical wave generated from heat and pressure detectable during both operation and for testing. A block diagram 31 shows the receiving and processing of the acoustic transmission. The illustration depicts how the system for acoustical detection in the TMD device 1 is used to its maximum, and it shows that the restrictions can be implemented to prevent the burst of the TMD device 1, as well as, to direct the overall pipeline operation in regards to a condition of critical hammer impact. Also shown are connector ports 29 and acoustic micro packs 32 with an alternative flanged fitting 33 for testing. FIGS. 15a-15d are a graphical presentation of the four stages of an acoustical impact.

We claim:

1. A device to mitigate transient events in a transported medium of fluids and gases subjected to surges, and over pressure events caused by the transient state of a transported medium in a continuous pipeline, while acting as a continuous piece of the pipeline, comprising:
   a. an outer spool pipe as a casement to one or more concentrically positioned multilayered composite pipes comprising core pipe, helical and circular wrapping layers and sensors and readers, with an annular space between the spool pipe and the multilayered composite pipes, said annular space filled with a fluid medium;
   b. end piece adaptors for connection to pipeline open ends when the device is installed inline to the pipeline and where the end piece adaptors each further comprise flanges, chambers for excess pressure mitigation from the annular space, connection for monitoring instruments and an instrumental monitoring port, and;
   c. instrumentation and monitoring running longitudinally for the full length of the device.

2. The device of claim 1 where the outer spool pipe is of multilayered composite material and the device can be assembled in hose form capable of being flat coiled.

3. The device of claim 1 further designed to reduce amplification of transient pressure waves by simulation of counter waves where the end piece adaptors further comprise a contra wave injector to extend the annular space to expand the multilayered composite pipes to sinusoidal shape within the outer spool pipe.

4. The device of claim 3 further comprising annulus spacers to provide for orientation of sinusoidal movement of the multilayered composite pipes.

5. The device of claim 4 further comprising a management system for receiving, processing and transmitting information gathered from the instrumental monitoring port on each end piece adaptor and in combination with existing pipeline monitoring.

6. The device of claim 1 further comprising an acoustical detection system for receiving and processing of acoustic transmission due to an acoustical wave generated from heat and pressure detected through an acoustic micro pack.

7. A method of mitigating transient events in a transported medium of fluids and gases subjected to surges, and over pressure events caused by the transient state of a transported medium in a pipeline, comprising the steps of:
   a. installing an inline device to function as both a mitigation device and fully functional pipeline component in the pipeline where said device comprises:
      an outer spool pipe as a casement to one or more concentrically positioned multilayered composite pipes comprising core pipe, helical and circular wrapping layers and sensors and readers, with an annular space between the spool pipe and the multilayered composite pipes, said annular space filled with a fluid medium;
      end piece adaptors for connection to pipeline open ends when the device is installed inline to the pipeline and where the end piece adaptors each further comprise flanges, chambers for excess pressure mitigation from the annular space, connection for monitoring instruments and an instrumental monitoring port, and;
      instrumentation and monitoring running longitudinally for the full length of the device;
   b. monitor increased pressure events in the pipeline by installing a management system for receiving, processing and transmitting information gathered from the instrumental monitoring port on each end piece adaptor and in combination with existing pipeline monitoring;
   c. allow the inline device to mitigate high pressure impact by energy dissipation.

8. The method of claim 7 where the installed inline device further comprises a contra-wave injector to extend the annular space to expand the multilayered composite pipes to sinusoidal shape within the outer spool pipe, and in response to a pressure wave in the pipeline the multilayered composite pipes are expanded to a sinusoidal shape to initiate an active counter wave to the pressure wave to reduce amplification of the pressure wave.

9. The method of claim 8 where the inline device further comprises an acoustical detection system to detect an acoustical wave generated from heat and pressure in the pipeline and upon detection of an acoustical wave, initiate a response to protect the pipeline.

* * * * *